United States Patent
Lundahl et al.

(10) Patent No.: US 6,225,587 B1
(45) Date of Patent: May 1, 2001

(54) ELECTROSTATIC SEPARATION OF CHAFF FROM GRAIN

(76) Inventors: E. Cordell Lundahl, 90 S. Sherwood Dr., Providence, UT (US) 84332; Brandon Eliason, 2652 N. Caribou Way, Meridian, ID (US) 83642; Joe Hays, 8703 A Schick Rd., Austin, TX (US) 78729; Jeff Stout, 4207 Gertrude St., Simi Valley, CA (US) 93063; Robert Wagner, 104 Grant Ct., Portland, TN (US) 37148; Mark Wangsgaard, 543 S. 900 East, Apt. B7, Salt Lake City, UT (US) 84102; Randall Wuthrich, 1416 E. Ironwood Dr., Chandler, AZ (US) 85225

( * ) Notice: Subject to any disclaimer, the term of this patent is extended or adjusted under 35 U.S.C. 154(b) by 0 days.

(21) Appl. No.: 08/884,496

(22) Filed: Jun. 27, 1997

(51) Int. Cl.[7] .................................................. B03C 7/00
(52) U.S. Cl. ...................... 209/127.4; 209/638; 209/642; 209/130
(58) Field of Search ................... 209/127.4, 128, 209/129, 130, 127.1, 638, 642

(56) References Cited

U.S. PATENT DOCUMENTS

| | | | |
|---|---|---|---|
| 2,071,460 | * | 2/1937 | Grave .................................... 209/128 |
| 2,127,307 | * | 8/1938 | Oppen et al. ...................... 209/127.1 |
| 2,548,771 | * | 4/1951 | Carpenter .......................... 209/127.1 |
| 2,839,189 | * | 6/1958 | Johnson ............................. 209/127.1 |
| 3,012,668 | * | 12/1961 | Fraas .................................. 209/127.1 |
| 3,322,275 | * | 5/1967 | Breakiron et al. ................ 209/127.1 |
| 4,363,723 | * | 12/1982 | Knoll et al. ............................ 209/128 |
| 4,738,772 | * | 4/1988 | Giesfeldt .......................... 209/127.1 |
| 5,735,402 | * | 4/1998 | Pezzoli et al. ...................... 209/129 |

FOREIGN PATENT DOCUMENTS

3213399 * 10/1983 (DE) ................................ 209/127.4

* cited by examiner

*Primary Examiner*—Christopher P. Ellis
*Assistant Examiner*—Joe Dillon, Jr.
(74) *Attorney, Agent, or Firm*—Thompson E. Fehr

(57) ABSTRACT

A method and device for the electrostatic separation of chaff from grain. An nonconductive continuous belt moves a mixture of grain and chaff past an ionizing electrode, which imparts an electrical charge to the grain particles and the particles of chaff within the mixture. A grounded electrically conductive rotating drum spaced apart from the end of the continuous belt toward which the mixture of chaff and grain is transported so that the charged particles will be acted upon both by the force of gravity and the electrical field between the particles and the grounded drum with the result that the grain particles, having a greater ratio of mass density to electrical charge than do the particles of chaff will be influenced principally by gravity and caused to fall toward the ground while the particles of chaff will be influenced primarily by the electrostatic field and attracted to the drum, the rotation of which drum will move the attracted particles of chaff up and over the ground drum to the side of the grounded drum that is away from the continuous belt where a scraper assures that virtually all of the chaff is removed from the grounded drum.

5 Claims, 2 Drawing Sheets

ELECTROSTATIC SEPARATION OF CHAFF FROM GRAIN

BACKGROUND OF THE INVENTION

1. Field of the Invention

This invention relates to a device and method for separating chaff from grain through the use of an electrostatic force.

2. Description of the Related Art

Several patents have utilized electric force in conjunction with the separation of impurities from grain.

U.S. Pat. No. 224,719 of Thomas B. Osborne is explicitly directed to removing contaminants from ground grain. In lines 17 through 21 of page 1, the Osborne patent states, "This invention relates to an improvement in devices for purifying ground grain, such as wheat, &c., the object being to remove all the particles which depreciate the quality of the flour . . . " claim 1 of the Osborne patent, moreover, is directed to the "process herein described for purifying flour . . . ."

Removing contaminants from ground grain is, however, technologically far different from removing chaff from grain as part of the harvesting process. And basic health concerns would dictate the preference for removing chaff prior to grinding the grain.

Secondly, it does not appear that "electrostatic separation" would be appropriate terminology for the technique of Mr. Osborne; and, indeed, U.S. Pat. No. 224,719 does not utilize such terminology. In the device of that patent, as stated on lines 54 through 63 of page 1, "Longitudinally over the receiver several rolls . . . are arranged parallel with each other and connected to the driving-shaft by bevel-gears . . . so as to be revolved . . . . These rolls run near the surface of the ground material in the receiver, and they are made from, or their surfaces coated with, hard rubber or equivalent material capable of being electrified or to present and electrified surface." Continuing on lines 64 through 82 of page 1, U.S. Pat. No. 224,719 provides, "Above each roll, or at some point above the receiver, is a pad . . . presenting to each roll, and so as to bear upon it, a cushion or surface of wool or equivalent material which will generate more or less electricity in consequence of the hard rubber rubbing against the said cushion, and giving to the rolls an electrified surface and an attractive power which will take from the surface of the ground material the lighter particles, such particles rising and attaching themselves to the rolls by the attractive power thus generated, and, adhering to the rolls, they ride upon the surface until they strike the cushion . . . above, or some other obstruction, then, being detached, will drop into troughs . . . below, which are in such relative position to the rolls as to catch the particles when they drop therefrom. The said troughs extend over the receiver parallel with the rolls."

Professors Dale R. Corson and Paul Lorrain, in their textbook *Introduction to Electromagnetic Fields and Waves*, W. H. Freeman and Company (1962), on page vii declare, "The first chapter deals with vector analysis in Cartesian, orthogonal curvilinear, cylindrical, and spherical coordinates. The following three chapters then cover electrostatic fields, first in a vacuum, and then in dielectrics." At the beginning of Chapter 5, on page 176, they state, "Our discussion of electromagnetic field theory has been limited so far to the effects of charges at rest." Consistently, "electrostatics" is defined as "[t]he study of the properties of electric charges at rest," on page 834 in volume 2 of the *Encyclopaedic Dictionary of Physics*, The MacMillan Company, Pergamon Press (1961), J. Thewlis, editor-in-chief.

In his textbook *Classical Electrodynamics*, John Wiley & Sons (1962), on page 1, Professor John David Jackson, however, provides a slightly different definition: "We will begin our discussion with the subject of electrostatics—problems involving time-independent electric fields." This second definition appears to find some support on page 103 of *Classical Electromagnetic Radiation*, Academic Press (1965), where Professor Jerry B. Marion comments, "In the preceding chapters we have discussed the mathematical description of static electric and magnetic fields . . . . We now wish to consider the more general situation in which the field quantities may depend upon the time."

Clearly, the charges in Osborne's rolls are moving. Furthermore, since the only method disclosed for causing the rolls to rotate is a hand-operated crank, the rotational motion of the rolls is unlikely to be uniform and would, therefore, create a time-dependent electromagnetic field.

Thirdly, the device of Osborne's U.S. Pat. No. 224,719, as portrayed in the drawings, the Osborne invention would not work. The troughs, N, actually touch the rolls, I, so that any light material attracted to a roll, I, would be scraped from the roll by the bottom of the trough, N. Furthermore, even if the light material could evade the trough, the placement of the pad, L, with respect to each roll, I, would tend to cause any light material displaced from the roll, I, by the pad, L, to fall back upon and be attracted again to the roll, I.

U.S. Pat. No. 4,534,856 to Louis C. Weiss and Devron P. Thibodeaux involves a set of parallel electrodes encased in a plastic panel upon which items to be separated, such as chaff from wheat fragments, are placed and charged. The voltage is then increased to effect levitation of the items and separation by means of an undulating traveling wave electric field. In fact, on lines 14 through 17 of column 3, Weiss' patent states, "In the Masuda-type travelling-wave apparatus, parallel sets of individual conductors connected to an A.C. electrical source form an undulating electric field in the surrounding air." The patent continues, on lines 26 through 30 of column 3, "If three phases of an A.C. voltage are connected successively to the different conductors, a series of traveling electric-waves are created. Material within the field is carried along as if on an invisible conveyor."

Certainly, under either definition, Weiss' invention is not an electrostatic process. As a matter of fact, Weiss' patent is entitled "Electrodynamic Method for Separating Components."

U.S. Pat. No. 1,355,477 of Sylvester S. Howell does apparently utilize an electrostatic system; but it merely enhances the separation of chaff from grain through the traditional process of winnowing, i.e., blowing air through the mixed grain and chaff, rather than providing an electrostatic method which can, by itself, perform the separation. There is an upper plate that is parallel to a lower plate. Particles placed upon the lower plate are charged, and some of these particles (presumably the chaff) are attracted toward the upper plate and thereby lifter from the lower plate. A stream of air is then blown between the plates to effect the separation.

And several patents, such as U.S. Pat. No. 4,116,822 of Clyde B. Webb, discharge material to be separated by electrical forces directly onto a rotating drum and then use electrical forces to causes different types of material to be discharged from the surface of the drum at different positions.

SUMMARY OF THE INVENTION

The present invention uses an electrically non-conductive continuous belt to pass a mixture of grain and chaff past ionizing electrodes which impart electrical charge to the grain and chaff particles. A grounded electrically conductive rotating drum is spaced apart from the end of the continuous belt toward which the mixture is transported.

As the mixture passes the end of the continuous belt which is nearer to the drum, the particles in the mixture are acted upon by the force of gravity and the electrical field between the particles and the grounded drum. The grain particles have a greater ratio of mass density to electrical charge than do the particles of chaff. Therefore, gravity has a proportionally greater effect on the grain particles than on the particles of chaff. Conversely, the electrostatic force has a proportionally greater effect upon the particles of chaff. Consequently, the grain particles tend to fall toward the earth, and the particles of chaff are attracted to the grounded drum.

Rotation of the grounded drum moves the attracted particles of chaff up and over the grounded drum to the side of the grounded drum that is away from the continuous belt.

The applied electrical forces with the present invention are, thus, all electrostatic; and only the chaff, not the mixture of grain and chaff, is applied to the rotating drum.

DESCRIPTION OF THE PREFERRED EMBODIMENT

Figure 1:
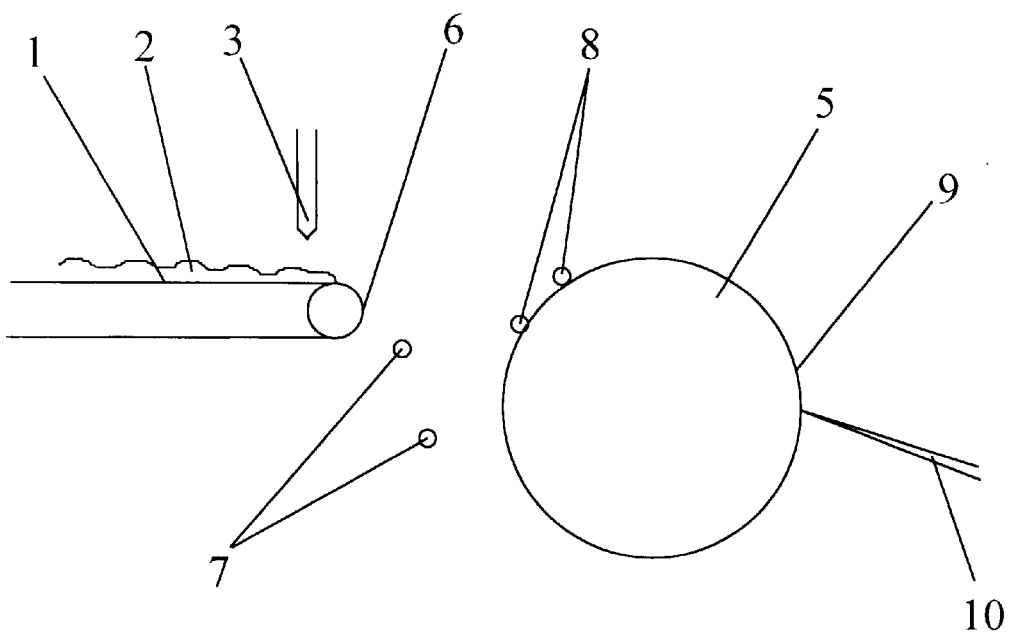
FIG. 1 portrays the basic embodiment of the device for electrostatically separating chaff from grain.

The device for electrostatically separating chaff from grain, as depicted in FIG. 1, has a non-conductive continuous belt 1 which transports a mixture of chaff and grain 2 past an ionizing electrode 3.

The ionizing electrode 3 imparts an electrical charge to the particles within the mixture 2.

Figure 2:
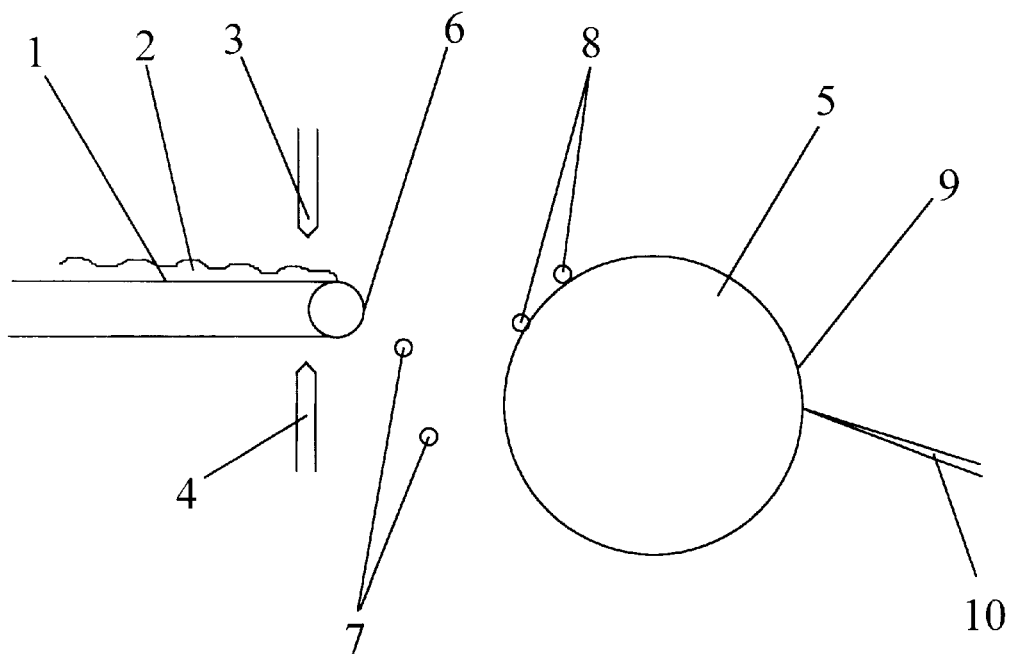
FIG. 2 adds to the embodiment of FIG. 1 an ionizing electrode below the continuous belt.

And, as illustrated in FIG. 2, the ionizing electrode 3 is preferably located above the continuous belt 1, i.e., on the side of the continuous belt 1 upon which the mixture 2 is transported, while an auxiliary ionizing electrode 4 is placed below the continuous belt 1.

A grounded electrically conductive rotating drum 5 is spaced apart from the end 6 of the continuous belt toward which the mixture 2 is transported.

In accordance with the previous explanation, as the mixture 2 passes the end 6 of the continuous belt 1 which is nearer to the drum 5, the particles in the mixture 2 are acted upon by the force of gravity and the electrical field between the particles and the grounded drum 5. The grain particles 7 have a greater ratio of mass density to electrical charge than do the particles of chaff 8. Therefore, gravity has a proportionally greater effect on the grain particles 7 than on the particles of chaff 8. Conversely, the electrostatic force has a proportionally greater effect upon the particles of chaff. 8. Consequently, the grain particles 7 tend to fall toward the earth, and the particles of chaff 8 are attracted to the grounded drum 5.

Rotation of the grounded drum 5 moves the attracted particles of chaff 8 up and over the grounded drum 5 to the side 9 of the grounded drum 5 that is away from the continuous belt 1. A scraper 10 assures that virtually all of the chaff 8 is removed from the grounded drum 5.

Preferably, two stages 11, 12 are involved in the process of separating the chaff from the grain.

Figure 3:
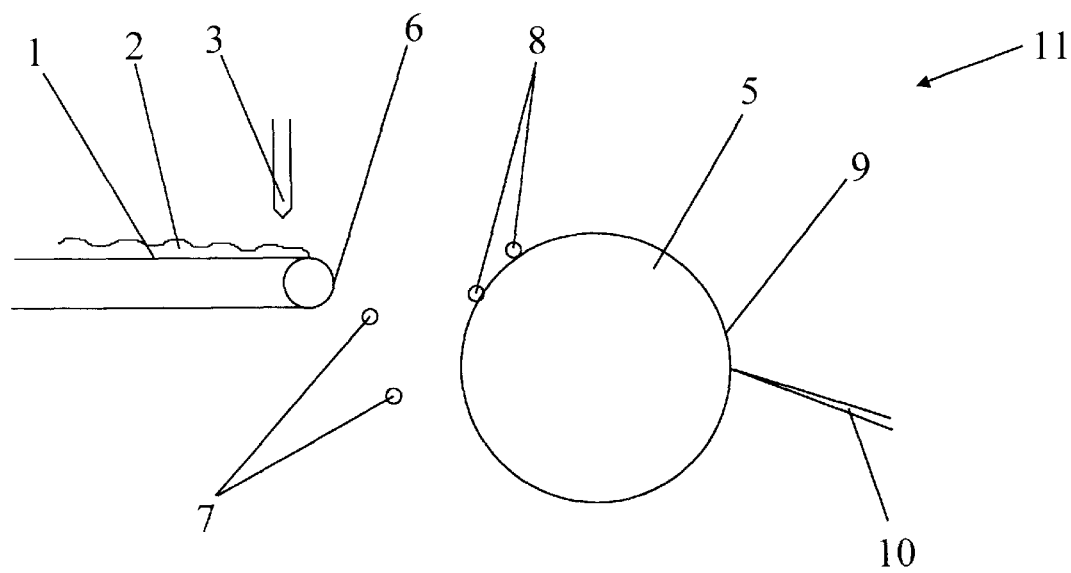
FIG. 3 illustrates the two-stage embodiment of the device for electrostatically separating chafff from gain.
Figure 3:
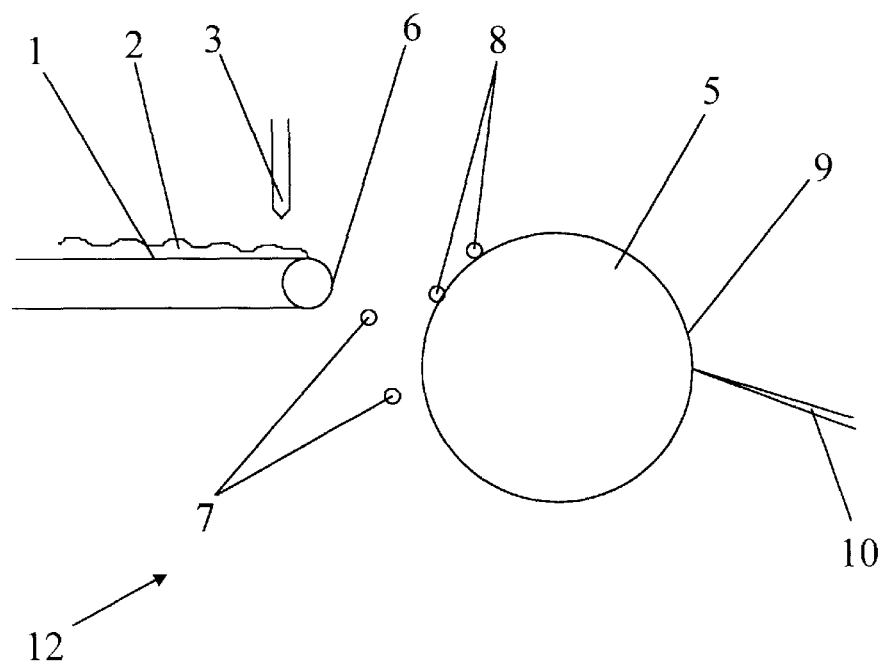

The first stage 11 proceeds as described above. Then, as illustrated in FIG. 3, to remove the heavier chaff from the material which has principally been affected by gravity during the first stage 11, in the second stage 12, the speed at which the continuous belt 1 moves is decreased, as is the spacing between the continuous belt 1 and the grounded drum 5. The grounded drum 5 and the continuous belt 1, because of the electrical charge on the mixture 2, comprise surfaces which generate the electrostatic field.

What is claimed is:

1. A device for the electrostatic separation of chaff from grain, which comprises:

an ionizing electrode for imparting an electrical charge the particles of a mixture of chaff and grain;

a non-conductive continuous belt for transporting the mixture of chaff and grain past said ionizing electrode;

a grounded electrically conductive rotating drum spaced apart from the end of the continuous belt toward which the mixture of chaff and grain is transported so that the charged particles will be acted upon both by the force of gravity and the electrical field between the particles and the grounded drum with the result that the grain particles, having a greater ratio of mass density to electrical charge than do the particles of chaff will be influenced principally by gravity and caused to fall toward the ground while the particles of chaff will be influenced primarily by the electrostatic field and attracted to the drum, the rotation of which drum will move the attracted particles of chaff up and over the ground drum to the side of the grounded drum that is away from the continuous belt.

2. The device for the electrostatic separation of chaff from grain as recited in claim 1, wherein:

the spacing of the ground drum from the end of the continuous belt is selected so that the force of gravity acting alone cannot cause any of the mixture to reach said grounded electrically conducting rotating drum.

3. A process for the electrostatic separation of chaff from grain, which comprises:

imparting an electrical charge to the particles of chaff and grain as the particles are conveyed by a non-conducting belt; and exposing the resultant electrically charged chaff and grain to an electrostatic field which, because the grain particles have a greater ratio of mass density to electrical charge than do the particles of chaff, has a proportionally greater effect on the chaff than on the grain and thereby causes the chaff and grain to be moved to different locations over time.

4. A process for the electrostatic separation of chaff from grain, which comprises:

transporting a mixture of particles of chaff and grain past an ionizing electrode with a non-conducting belt;

imparting an electrical charge to the particles of chaff and grain with the ionizing electrode; and allowing the particles of chaff and grain to be influenced by gravity to move in one direction and by an electrostatic force to move in another direction so that the greater ratio of mass density to electrical charge in the grain particles causes the grain particles to move principally as compelled by gravity and the particles of chaff to move principally as compelled by the electrostatic field.

5. The process for the electrostatic separation of chaff from grain as recited in claim 4, further comprising:

moving the particles which have moved principally as compelled by gravity again past the ionizing electrodes but at a slower speed than was utilized before;

again imparting an electrical charge to the particles of chaff and grain with the ionizing electrode; and again allowing the particles of chaff and grain to be influenced by gravity to move in one direction and by an electrostatic force to move in another direction so that the greater ratio of mass density to electrical charge in the grain particles causes the grain particles to move principally as compelled by gravity and the particles of chaff to move principally as compelled by the electrostatic field but utilizing an electrostatic field which has been altered from the electrostatic field utilized previously by decreasing the distance between the surfaces which generate the electrostatic field.

* * * * *